US012323636B2

(12) United States Patent
Silverstein et al.

(10) Patent No.: US 12,323,636 B2
(45) Date of Patent: Jun. 3, 2025

(54) MULTI-CONTENT INTERACTIONS

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Hamid Majdabadi, Ottawa (CA); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 18/474,440

(22) Filed: Sep. 26, 2023

(65) Prior Publication Data

US 2025/0106444 A1  Mar. 27, 2025

(51) Int. Cl.
*H04N 21/218* (2011.01)
*H04N 21/2187* (2011.01)
*H04N 21/431* (2011.01)

(52) U.S. Cl.
CPC ....... *H04N 21/2187* (2013.01); *H04N 21/431* (2013.01)

(58) Field of Classification Search
CPC ........... H04N 21/2187; H04N 21/4122; H04N 21/4147; H04N 21/431; H04N 21/4331; H04N 21/44218
USPC ........................................................ 725/37
See application file for complete search history.

(56) References Cited

U.S. PATENT DOCUMENTS

| 10,657,462 | B2 | 5/2020 | Tofighbakhsh |
| 11,941,185 | B1 * | 3/2024 | Publicover ....... H04N 21/42204 |
| 2014/0181910 | A1 | 6/2014 | Fingal |
| 2019/0297388 | A1 | 9/2019 | Panchaksharaiah |
| 2022/0210111 | A1 | 6/2022 | Greenberg |
| 2023/0224514 | A1 | 7/2023 | Jhaveri |

FOREIGN PATENT DOCUMENTS

KR  20140101428 A  *  8/2014  ........... H04N 21/654

OTHER PUBLICATIONS

Disclosed Anonymously, "Mobile Content Minimization and De-Focusing Based on Content Relevancy", ip.com, IPCOM000272654D, Jul. 10, 2023, 6 pages.
Freedom, "Freedom blocks distracting websites and apps", https://freedom.to/, Accessed on Aug. 29, 2023, 2 Pages.
(Continued)

*Primary Examiner* — Dominic D Saltarelli
(74) *Attorney, Agent, or Firm* — Rakesh Roy (57) ABSTRACT

A method, computer system, and a computer program product for multi-content interactions is provided. The present invention may include detecting a user engaging with a first content and a second content simultaneously. The present invention may also include determining that the user is more engaged with the second content relative to the first content. The present invention may further include executing a content preserving action to enable the user to reengage with the first content without missing any segments of the first content.

20 Claims, 3 Drawing Sheets

(56) References Cited

OTHER PUBLICATIONS https://www.forestapp.cc/, "Forest is an app that helps you stay focused on the important things in life.", Accessed on Aug. 21, 2023, 9 Pages.

https://www.thebusinessresearchcompany.com/report/media-global-market-report, "Media Market Size, Trends and Global Forecast to 2032", Jan. 2023, 57 Pages.

IBM, "Digital solutions to transform the media and entertainment industry Reimagining media and entertainment for a digital world.", https://www.ibm.com/industries/media-entertainment, Accessed on Aug. 21, 2023, 2 Pages.

IBM, "Enterprise Video Platform and CMS", ttps://www.ibm.com/watson/media/internal-video-for-corporate-communications, Accessed on Aug. 21, 2023, 9 Pages.

IBM, "Live Streaming and Video Hosting Solutions", https://www.IBM.com/watson/media, Accessed on Aug. 21, 2023, 9 Pages.

META, "Mobile and T: Between the Screens", https://www.facebook.com/business/news/insights/mobile-and-tv-between-the-screens, Jul. 10, 2017, 12 Pages.

Richter, "Infographic: One Screen is Not Enough!", https://www.statista.com/chart/16738/second-screen-usage-while-watching-tv/, Accessed on Aug. 21, 2023, 3 Pages.

IBM, "IBM Industry Solutions", https://www.ibm.com/industries, Accessed on Sep. 26, 2023, 1 Page.

Disclosed Anonymously, "Method and System for Providing Time Based Social Alerting Based on App Usage", IPCOM000258812D, Jun. 17, 2019, 3 Pages.

\* cited by examiner

MULTI-CONTENT INTERACTIONS

BACKGROUND

The present invention relates generally to the field of computing, and more particularly to digital media consumption.

Users today are spending more time looking at screens than any previous generations. Further, it is becoming increasingly common for users to interact with multiple screens to engage with multiple contents at the same time. However, parallel content engagements may often lead to users losing focus on one content while interacting with another content.

SUMMARY

Embodiments of the present invention disclose a method, computer system, and a computer program product for multi-content interactions. The present invention may include detecting a user engaging with a first content and a second content simultaneously. The present invention may also include determining that the user is more engaged with the second content relative to the first content. The present invention may further include executing a content preserving action to enable the user to reengage with the first content without missing any segments of the first content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

The following described exemplary embodiments provide a system, method, and computer program product for multi-content interactions. As such, the present embodiment has the capacity to improve the technical field of digital media consumption by detecting a user's focus shifting from a primary content to a secondary content and preserving the primary content to prevent the user from missing the primary content while the user is more focused on the secondary content. More specifically, a multi-content interaction program may detect a user engaging with a first content and a second content simultaneously. Then, the multi-content interaction program may determine that a user engagement with the second content is greater than the user engagement with the first content. In response to that determination, the multi-content interaction program may execute a content preserving action to enable the user to reengage with the first content without missing any segments of the first content.

As described previously, users today are spending more time looking at screens than any previous generations. Further, it is becoming increasingly common for users to interact with multiple screens to engage with multiple contents at the same time. However, parallel content engagements may often lead to users losing focus on one content while interacting with another content. Therefore, a solution is needed to enable users to fully consume multiple content streams.

As such, it may be advantageous to, among other things, enable a multi-modal content interaction by detecting a greater user engagement in a secondary content (relative to a primary content) and a lesser user engagement in the primary content (relative to the secondary content) and automatically minimizing the secondary content to revert the user's focus (e.g., engagement) back to the primary content or pausing/rewinding/recording the primary content for the duration of the greater user engagement in the secondary content.

According to one embodiment, a user may interact with a first content and a second content that are co-located on a single device (e.g., mobile device). In such embodiments, the single device may simultaneously display the first content on a first screen (e.g., first window) and the second content on a second screen (e.g., second window) using picture-in-picture (PIP) methods. The multi-content interaction program may dynamically adjust the PIP size (e.g., first screen or second screen) based on the user's engagement, interest, and interaction parameters with the first content and the second content.

According to another embodiment, the first content and the second content may be located on different devices on the user's local network or surrounding network. For example, the user may watch the first content on a television (TV) and interact with the second content on another digital device (e.g., mobile device), where the TV and mobile device are integrated Internet of Things (IoT) devices on the user's local network. If the user is more engaged with the second content on the mobile device, the multi-content interaction program may execute one or more content preserving actions. That is, the multi-content interaction program may dynamically interrupt (e.g., pause, rewind) or record the first content on the alternative device (e.g., TV) to enable the user to reengage with the first content. In one embodiment, if the first content is live and not able to be paused, the multi-content interaction program may dynamically interrupt (e.g., minimize/close out) the second content to enable the user to reengage with the first content.

According to one embodiment, the multi-content interaction program may consider other adjacent or nearby users engaging with the first content with the user as additional decision making logic. Multiple users may opt-in to use the multi-content interaction program. In such embodiments, if the multi-content interaction program determines that those users are also watching the first content being delivered, the multi-content interaction program may generate a multi-user aggregated calculation to determine if and which content preserving actions should be executed.

In a multi-user environment, if the multi-content interaction program determines that a majority of the users (e.g., over 75% of users) are paying attention to the first content, the multi-content interaction program may allow the first content to stream as normal. In such embodiments, the multi-content interaction program may record and transmit (e.g., to the minority of users) a link to any segments of the first content that may have been missed by the minority of users. If the multi-content interaction program determines that a minority of the users (e.g., less than 25% of users) are paying attention to the first content, the multi-content interaction program may execute a content preserving action (e.g., pause content) to stop the overall content, based on the determination that a larger part of the users will miss important segments of the first content delivery. If the multi-content interaction program determines that between 25% and 75% are paying attention to the first content, the multi-content interaction program may consult a ruleset indicating the hierarchy of participating users (e.g., users that have opt-in) at that point in time. For example, the two adults within the room may have higher priority for the delivery of the content stream and the four kids in the room may have lower priority. In this example, the attention of the two adults may be given higher priority when determining whether to interrupt the first content delivery. In some embodiments, the multi-content interaction program may also include a weighted delivery method for priority tie breaking.

According to one implementation of the present disclosure, the multi-content interaction program may include an opt-in function to enable a user to accept the program's terms of use before activating the program. By opting in, the user may provide the necessary permissions for the multi-content interaction program to interact with various user devices. For example, the user may allow their mobile device to interface with an alternative content consumption medium. In one embodiment, the alternative content consumption (e.g., streaming video; first content) may be co-located with another content (e.g., e-mail; second content) on the user's mobile device or the alternative content consumption may be separately located on an alternative device. If the alternative content is on an alternative device such as a TV screen, the multi-content interaction program may communicate with the mobile device and the alternative device through suitable networking tools and Application Programing Interface (API) protocols.

According to one embodiment, the multi-content interaction program may activate in response to determining that the user is involved in a multi-content interaction based on various factors. These factors may include, without limitations, pattern recognition on the user's device interfaces, profile selection by the user, micro location within a house or room and the associated known placement of devices in those locations, and interest-based segments of content detection while user is distracted. Once the multi-content interaction program is activated, the multi-content interaction program may begin monitoring event streams, user inputs, and other metadata from the user's mobile device. The multi-content interaction program may capture and analyze various data including, without limitations, scroll speed, user click frequency, eye tracking, content gazing, and other user interface (UI) interaction (e.g., saving content, bookmarking content, screen capturing content).

According to one embodiment, in response to detecting a degree of significance indicating that the user's attention is elsewhere (e.g., relative to the first content on the TV), the multi-content interaction program may execute a pause or rewind action on the first content. The multi-content interaction program may validate the preferred action based on the user's profile and device capabilities. For example, if the user device (e.g., TV) is capable of recording content, the multi-content interaction program may implement the user device to record any interrupted segments (e.g., segments of the first content missed by the user while their attention was elsewhere).

According to one embodiment, the multi-content interaction program may implement machine learning techniques, such as, for example, a long short-term memory (LSTM) model to predict the user's focus. In one embodiment, the multi-content interaction program may implement a recurrent neural network (RNN) to train the LSTM model using historical user focus data. The machine learning techniques may enable the multi-content interaction program to leverage a predictive measure with content-aware plot or key interest segments in conjunction with real-time user interaction data to determine the user's focus.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
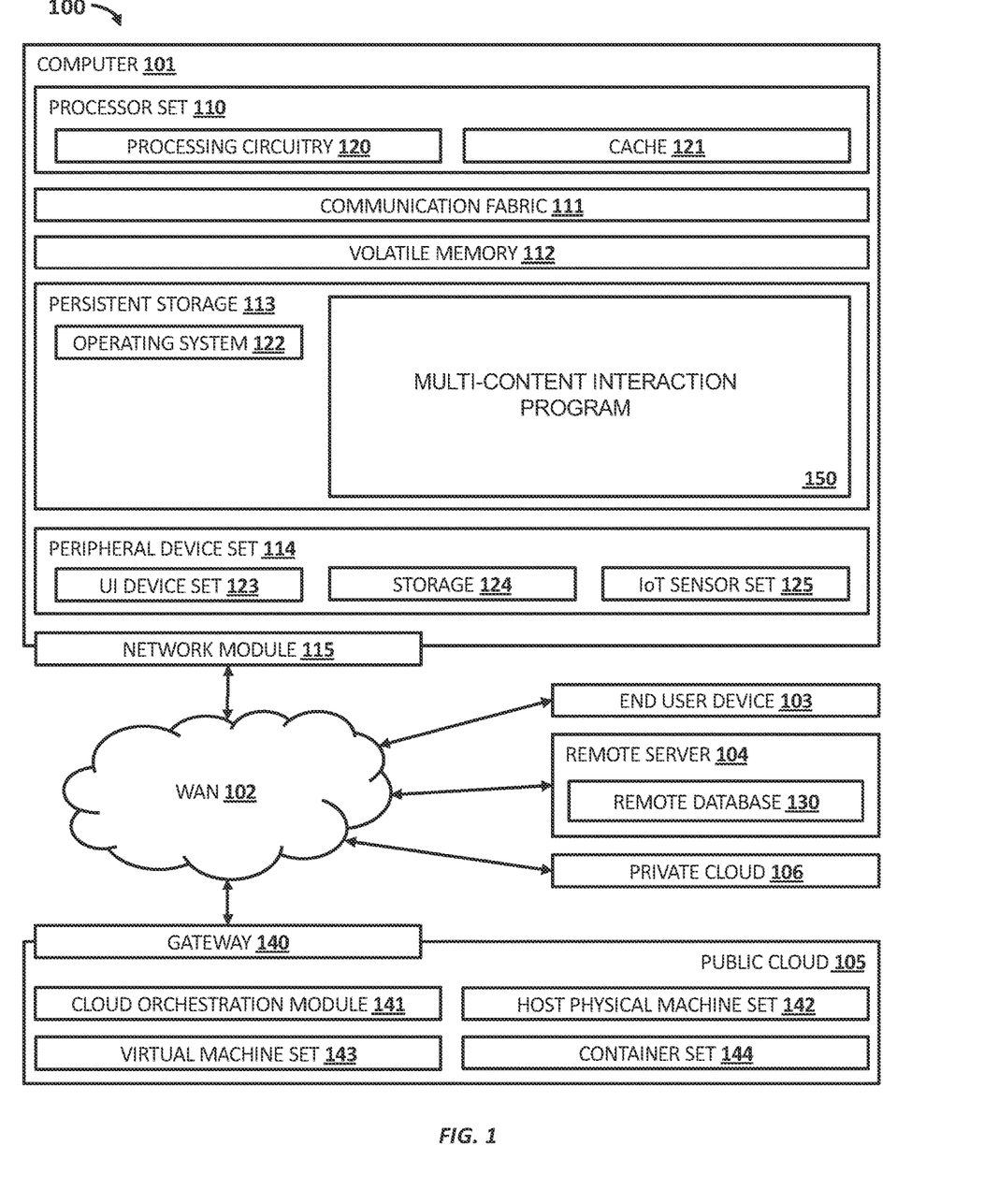
FIG. 1 illustrates a networked computing environment according to at least one embodiment.

Referring to FIG. 1, a computing environment 100 according to at least one embodiment is depicted. Computing environment 100 contains an example of an environment for the execution of at least some of the computer code involved in performing the inventive methods, such as multi-content interaction program 150. In addition to multi-content interaction program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multi-content interaction program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, multi-content interaction program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The multi-content interaction program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may use the multi-content interaction program 150 to enable engaging with a first content and one or more second contents in a way where the user does not miss out on the first content if the user's focus is temporarily shifted to the second content. Embodiments of the present disclosure are explained in more detail below with respect to FIGS. 2 and 3.

Figure 2:
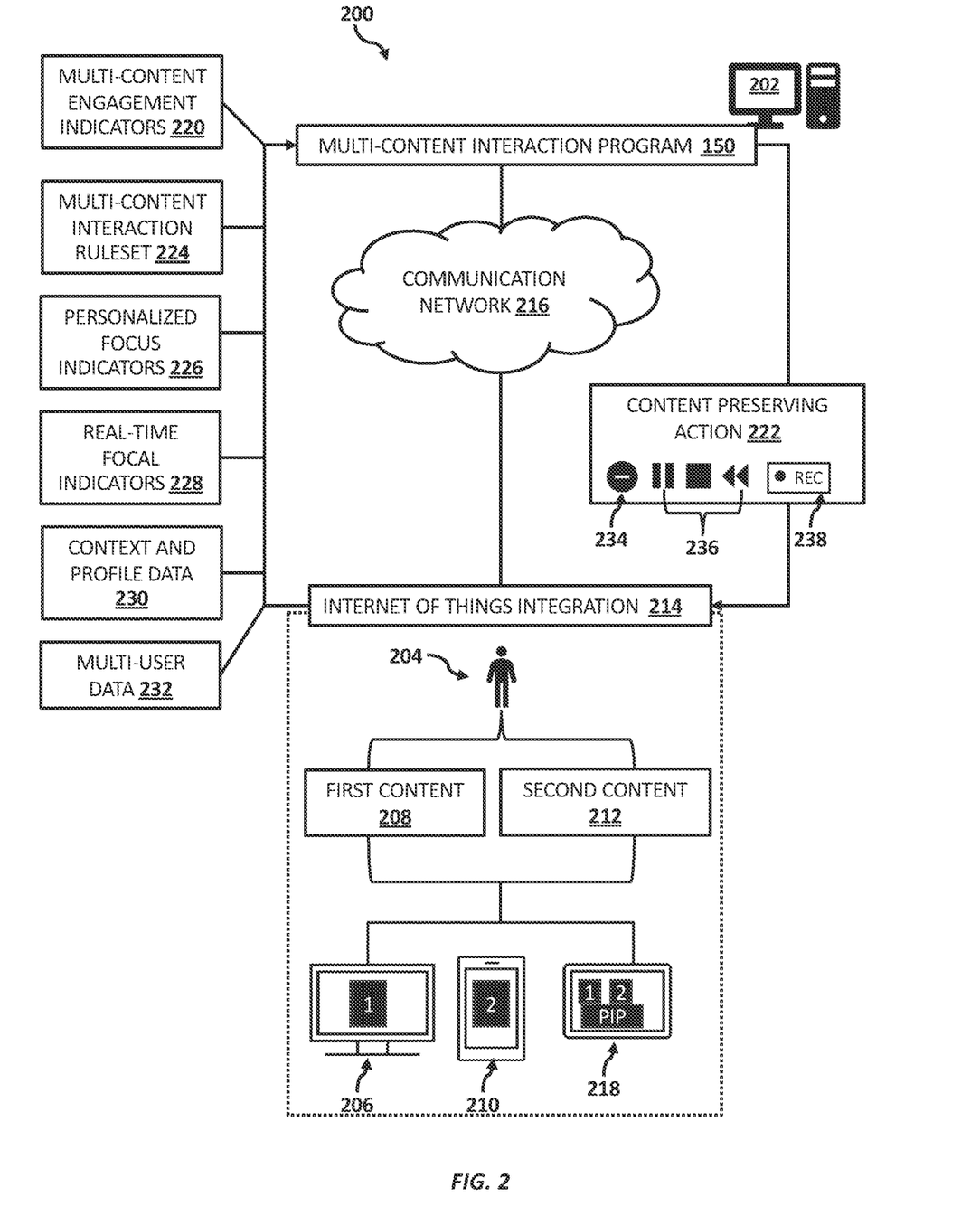
FIG. 2 is a schematic block diagram of a content management environment according to at least one embodiment.

Referring now to FIG. 2, a schematic block diagram of content management environment 200 according to at least one embodiment is depicted. According to one embodiment, the content management environment 200 may be implemented in the computing environment 100 described with reference to FIG. 1 and include a computer system 202 having a tangible storage device and a processor that is enabled to run the multi-content interaction program 150.

As such, various embodiments of the computer system 202 may include one or more components (e.g., computer 101; end user device (EUD) 103; WAN 102) of the computer environment 100. In one embodiment, the computer system 202 may include one or more computers (e.g., computer 101) which may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network, and/or querying a database. In at least one embodiment, aspects of the computer system 202 may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

According to one embodiment, the computer system 202 may include one or more user devices that are capable of generating and displaying content for a user 204. For example, computer system 202 may include a first user device 206 that may generate and display a first content 208 and a second user device 210 that may generate and display a second content 212. In one embodiment, the first user device 206 and the second user device 210 may be integrated into an IoT integration 214 to enable communication between the devices 206, 210 (e.g., first IoT device, second IoT device) and the multi-content interaction program 150 using a communication network 216. In at least one embodiment, the first content 208 and the second content 212 may be co-located on a single user device 218 (e.g., first user device 206; second user device 210; or any other user device) and displayed using a picture-in-picture (PIP) mode.

In one embodiment, the multi-content interaction program 150 may include a single computer program or multiple program modules or sets of instructions being executed by the processor of the computer system 202 (e.g., first user device 206, second user device 210, single user device 218). In one embodiment, the multi-content interaction program 150 may include routines, objects, components, units, logic, data structures, and actions that may perform particular tasks or implement particular abstract data types. In one embodiment, the multi-content interaction program 150 may be practiced in distributed cloud computing environments where tasks may be performed by local and/or remote processing devices which may be linked through communication network 216. In at least one embodiment, the multi-content interaction program 150 (e.g., the various modules) may be executed on a single computing device.

The communication network 216 may include various types of communication networks, such as the wide area network (WAN) 102, described with reference to FIG. 1. In some embodiments, the WAN may be replaced and/or supplemented by a local area network (LAN), a telecommunication network (e.g., 3G, 4G, 5G), a wireless network, a public switched network and/or a satellite network. In one embodiment, the communication network 216 may enable data to be transferred between the first user device 206, second user device 210, single user device 218 using short-range wireless technologies, such as, for example, Wi-Fi and/or Bluetooth® (Bluetooth and all Bluetooth-based trademarks and logos are trademarks or registered trademarks of Bluetooth SIG, Inc. and/or its affiliates).

According to one embodiment, user 204 may engage with multiple contents in parallel (e.g., first content 208 and second content 212 simultaneously) using the first user device 206 and the second user device 210 or the single user device 218 in PIP mode. In such parallel content engagements, the user 204 may engage with one of the contents more passively and the other one of the contents more actively. For example, the first content 208 may include a more passive form factor (e.g., user watching a video that is running in the background) relative to the second content 212 and the second content 212 may include a more interactive form factor (e.g., user scrolling through a news story) relative to the first content 208.

According to one embodiment, the multi-content interaction program 150 may detect that the user 204 is engaging with the first content 208 and the second content 212 simultaneously based on one or more multi-content engagement indicators 220. In one embodiment, the multi-content interaction program 150 may receive the engagement indicators 220 directly from the user devices (e.g., first user device 206, second user device 210, and/or single user device 218) or through the IoT integration 214.

According to one embodiment, one engagement indicator 220 may include recognizing a pattern in the user device interfaces that indicates parallel content consumption. For example, if the multi-content interaction program 150 detects multiple open windows on the single device 218, the multi-content interaction program 150 may determine that the user 204 is engaging with multiple contents using PIP mode in the single device 218. In one embodiment, another engagement indicator 220 may include detecting a matching user profile in multiple user devices generating multiple contents. For example, the multi-content interaction program 150 may detect a TV streaming a video content under a user profile that matches the user profile of a mobile device associated with user 204. In one embodiment, another engagement indicator 220 may include determining a microlocation within a house or room and the associated known placement of devices therein. For example, the multi-content interaction program 150 may determine, based on the IoT integration 214, that the first user device 206 displaying the first content 208 is in close proximity to the second user device 210 displaying the second content 212). In one embodiment, another engagement indicator 220 may include detecting interest-based segments of content while the user 204 is distracted. For example, the multi-content interaction program 150 may receive data from the user's mobile device (e.g., second user device 210) indicating that the mobile device is in a face recognition state while the TV is displaying an important video content. This may indicate that the face of the user 204 may have been directed towards the user's mobile device rather than the TV. In at least one embodiment, additional or alternative engagement indicators 220 may be received and analyzed by the multi-content interaction program 150 to determine if the user 204 is engaging in parallel content consumption.

As the user 204 engages with multiple contents at the same time, the attention (e.g., focus) of user 204 may shift away from the passive content (e.g., first content 208) and towards the active content (e.g., second content 212). In order to detect whether the attention of user 204 is shifting away from the first content 208 and towards the second content 212 and determine whether to execute one or more content preserving actions 222 to reengage the user 204 with the first content 208, the multi-content interaction program 150 may receive and analyze various additional inputs. The multi-content interaction program 150 may receive these additional inputs directly from the user devices (e.g., first user device 206, second user device 210, and/or single user device 218) or through the IoT integration 214. These additional inputs may include, without limitation, a multi-content interaction ruleset 224, a set of personalized focus indicators 226, one or more real-time focal indicators 228, one or more context and profile data 230, and one or more multi-user data 232.

According to one embodiment, the multi-content interaction ruleset 224 may include one or more parameters and rules guiding the implementation of the content preserving actions 222. In one embodiment, the ruleset 224 may be automatically set by the multi-content interaction program 150. In at least one embodiment, the multi-content interaction program 150 may enable the user 204 to manually set or adjust the ruleset 224.

According to one embodiment, ruleset 224 may indicate the types of parallel content interactions that may trigger the content preserving actions 222. For example, if the first content 208 is a video content and the second content 212 receives a high content engagement score, the multi-content interaction program 150 may trigger the content preserving actions 222. In one embodiment, the ruleset 224 may also indicate the types of parallel content interactions that may not trigger the content preserving actions 222. For example, if the first content 208 is a virtual work meeting and the second content 212 is a work chat, the multi-content interaction program 150 may allow the multi-tasking without interrupting the contents with the content preserving actions 222. In another example, if the first content 208 is a video content and the second content 212 receives a low content engagement score (e.g., playing a simple mobile game), the multi-content interaction program 150 may allow the multi-tasking without interrupting the contents with the content preserving actions 222. In one embodiment, the ruleset 224 may also include one or more content priority rules to indicate the types of content that may be flagged as a primary content on which the user 204 should focus their attention and the types of content that may be flagged as a secondary contents or distractions from focusing on the primary content. For example, the content priority rule may indicate that a virtual meeting content takes priority over a social media content. Thus, if the user 204 is engaging with the first content 208 by attending a virtual meeting and also engaging with the second content 212 by interacting with a social media post, the multi-content interaction program 150 may determine that the first content 208 is the primary content and the second content 212 is the secondary content. In one embodiment, the ruleset 224 may also indicate the types of device interactions that may be considered focus indicators. For example, the ruleset 224 may indicate that physical device interactions (e.g., typing, scrolling, clicking), content gazing, content saving, and content engagement score may be considered as focus indicators. In one embodiment, the ruleset 224 may also indicate the profile settings that may be considered when determining the user's focus or engagement. For example, the ruleset 224 may indicate that video content under the user's profile may be considered and video content under the user's child profile may be ignored. In one embodiment, the ruleset 224 may also indicate the frequency of the content preserving actions 222 (e.g., how frequently a content may be paused or minimized). In one embodiment, the ruleset 224 may also indicate the duration of the content preserving actions 220. For example, the ruleset 224 may indicate that a video content may be paused for the duration of the user engagement with the secondary content and then automatically resumed when the user engagement with the secondary content is completed. In one embodiment, the ruleset 224 may also indicate whether the content preservation actions 222 may be executed when multiple users are engaging with the same content at the same time. For example, the ruleset 224 may indicate if/what actions may be taken when a majority of the users are paying attention, if/what actions may be taken when a minority of users are paying attention, and if/what actions may be taken when more than a minority but less than a majority of the users are paying attention. In at least one embodiment, ruleset 224 may include additional or alternative parameters and rules for guiding the user's multi-content interactions.

According to one embodiment, the set of personalized focus indicators 234 may include a corpus of focus indicators that are personalized to the user 204. In one embodiment, the personalized focus indicators 234 may be manually entered by the user 204 to indicate when the user 204 may feel distracted from the primary content. In at least one embodiment, the personalized focus indicators 234 may be determined based on training a machine learning model (e.g., LSTM model) using historical focus data associated with the user 204. For example, the user 204 may have manually paused a video content while responding to a text message or may have manually rewound a video content after typing for 15 seconds. The multi-content interaction program 150 may use such historical focus data to train a machine learning model to predict when the user 204 is distracted.

According to one embodiment, the multi-content interaction program 150 may analyze the context and profile data 230 to determine the user devices and profiles that are engaging in the multi-content interactions. For example, if the multi-content interaction program 150 determines that the first content 208 is a video content under a child profile associated with a child of the user 204 and the second content 212 is a news story that user 204 is scrolling through on their mobile device, the multi-content interaction program 150 may determine that the video content under the child profile may not be relevant to user 204. In response, the multi-content interaction program 150 may ignore the video content and allow the user 204 to engage with the news story without triggering the content preserving actions 222.

According to one embodiment, the real-time focal indicators 228 may capture the physical interactions between the user 204 and one of the user devices (e.g., first user device 206; second user device 210; single user device 218), the user's content gazing interactions, and the user's content engagement score. In one embodiment, the physical interactions may include the key presses, taps, typing duration, click frequency, and scroll speed of the user 204 as they interact with one of the multiple contents (e.g., second content 212). In one embodiment, the content gazing may be determined by periodically checking if the mobile device of user 204 (e.g., second user device 210) is in a face recognition state (e.g., can the mobile device recognize the face of user 204). If the mobile device is determined to be in a face recognition state, the multi-content interaction program 150 may determine that a gaze (e.g., face) of the user 204 is directed towards the second content 212 displayed on the mobile device (e.g., second user device 210) and not the first user device 206 (e.g., TV) displaying the first content 208. In one embodiment, the content engagement score may indicate the user's interest in the actual content. In one embodiment, the content engagement score may provide a stronger indicator of the user's engagement with the substance of the content because it includes contextual metrics, including, without limitations, the user's time on a page of the content, social shares (e.g., whether the user shared the content with others), whether the user left a comment on the content, and the user's scroll depth on the content page.

According to one embodiment, the multi-content interaction program 150 may analyze the real-time focal indicators 228 and detect that the attention of user 204 may be shifting away from the passive content (e.g., first content 208) and towards the active content (e.g., second content 212). That is, the multi-content interaction program 150 may determine that a user engagement (e.g., engagement by the user) with the second content is greater than the user engagement with the first content. In such embodiments, the multi-content interaction program 150 may flag the first content 208 as the primary content on which the user 204 should focus their attention and may flag the second content 212 as the secondary content that is distracting the user 204 from focusing on the primary content.

According to one embodiment, in response to determining that the user 204 is more engaged with the second content 212 (e.g., secondary content) relative to the first content 208 (e.g., primary content), the multi-content interaction program 150 may execute one or more content preserving actions 222 to enable the user 204 to reengage with the first content 208 without missing any segments of the first content 208. According to one embodiment, the content preserving actions 222 may include, for example, a minimizing action 234 (e.g., minimizing content window; closing out content window; making content window inactive/defocused), a playback action 236 (e.g., pausing content, stopping content, rewinding content), and a recording action 238. In at least one embodiment, the content preserving actions 222 may also include other suitable actions to enable the user 204 to reengage with the first content 208 without missing any segments of the first content 208.

According to one embodiment, the multi-content interaction program 150 may execute the content preserving action 222 by communicating with the user devices (e.g., first user device 206; second user device 210; single user device 218) directly. In another embodiment, the multi-content interaction program 150 may execute the content preserving action 222 using the IoT integration 214 which enables the communication with the user devices.

According to one embodiment, the multi-content interaction program 150 may execute the content preserving action 222 on the first content 208, the second content 212, or both contents, depending on the content form factor and the capabilities of the user device displaying the content. In one embodiment, if the first content 208 is a live content (e.g., video live stream; virtual meeting) or unable to be paused, the multi-content interaction program 150 may execute the content preserving action 222 on the second content 212 to enable the user 204 to refocus/reengage with the first content 208. In one embodiment, executing the content preserving action 222 on the second content 212 may include executing the minimizing action 234 on the second content 212 to interrupt the user 204 from focusing on the second content 212. By interrupting the user 204 from interacting with the second content 212, the multi-content interaction program 150 may enable the user 204 to reengage with the first content 208. However, if the first content 208 is an on-demand content (e.g., on-demand video content) or otherwise controllable, the multi-content interaction program 150 may execute the content preserving action 222 on the first content 208 to enable the user 204 to reengage with the first content 208 at a later time (e.g., after the user is done with the second content 212) without missing any segments of the first content 208. In one embodiment, executing the content preserving action 222 on the first content 208 may include executing one of the playback actions 236 (e.g., pausing content, stopping content, rewinding content) and/or the recording action 238 to preserve the first content 208.

According to at least one embodiment, there may be other users who are adjacent or nearby user 204 who may be engaging with the first content 208 simultaneously with user 204. In such embodiments, the multi-content interaction program 150 may capture and analyze the multi-user data 232 (e.g., aggregated calculation) as additional decision making logic when determining whether to/which content preserving actions 222 to execute.

In a multi-user environment, if the multi-content interaction program 150 determines that a majority of the users (e.g., over 75% of users) are paying attention to the first content 208, the multi-content interaction program 150 may allow the first content 208 to stream as normal. In such embodiments, the multi-content interaction program 150 may implement the record action 238 of the content preserving actions 222 and transmit (e.g., to the minority of users) a link to any segments of the first content 208 that may have been missed by the minority of users.

If the multi-content interaction program 150 determines that a minority of the users (e.g., less than 25% of users) are paying attention to the first content 208, the multi-content interaction program 150 may execute the playback action 236 (e.g., pause action) to stop the overall first content 208, based on the determination that a majority of the users will miss important segments of the first content 208 delivery. If the multi-content interaction program 150 determines that between 25% and 75% are paying attention to the first content 208, the multi-content interaction program 150 may consult the ruleset 224 indicating the hierarchy of participating users (e.g., users that have opt-in) at that point in time. For example, based on ruleset 224, the multi-content interaction program 150 may determine that the two adults within the room may have higher priority for the delivery of the first content 208 stream and the four kids in the room may have lower priority. In this example, the attention of the two adults may be given higher priority when determining whether to interrupt the first content 208 delivery. In some embodiments, the multi-content interaction program 150 may also include a weighted delivery method for priority tie breaking.

Figure 3:
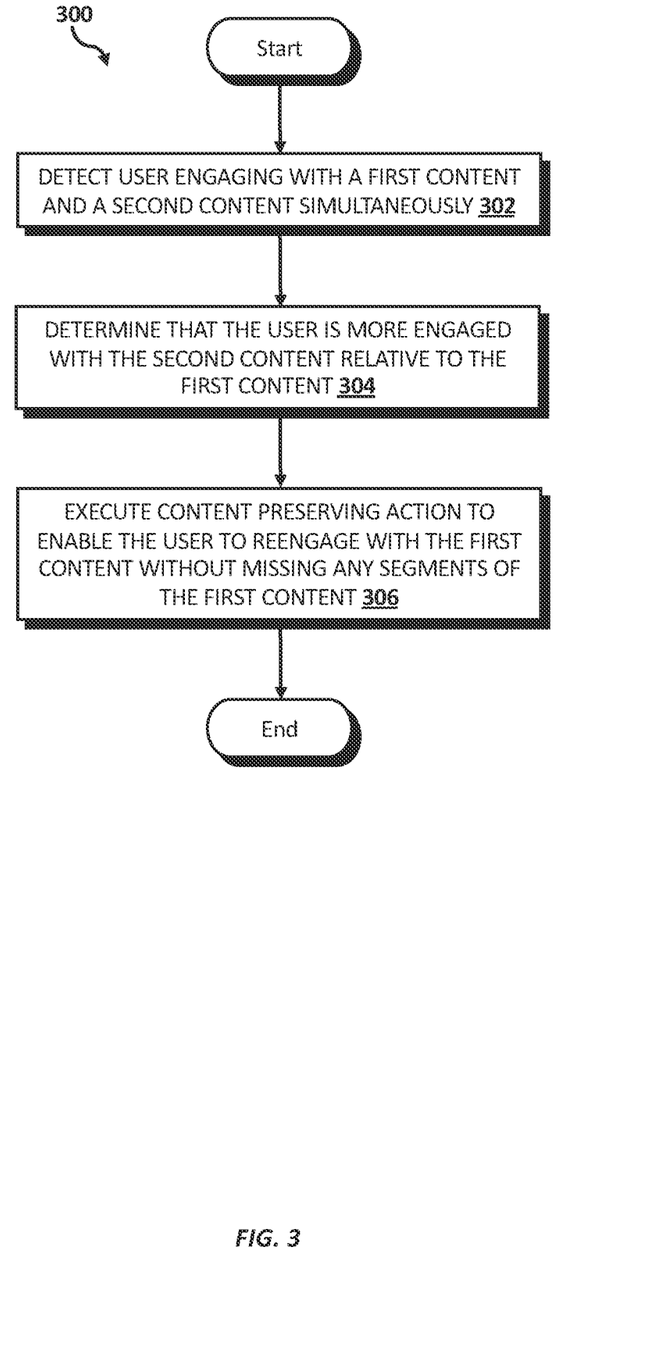
FIG. 3 is an operational flowchart illustrating a process for multi-content interactions according to at least one embodiment.

Referring now to FIG. 3, an operational flowchart illustrating an exemplary multi-content interaction process 300 used by the multi-content interaction program 150 according to at least one embodiment is depicted. FIG. 3 provides a description of process 300 with reference to the content management environment 200 (FIG. 2).

At 302, a detection is made of a user engaging with a first content and a second content simultaneously. According to one embodiment, the multi-content interaction program 150 may detect the simultaneous engagement based on one or more engagement indicators. In one embodiment, under one engagement factor, the multi-content interaction program 150 may recognize a pattern in the user device interfaces that indicates parallel content consumption. In one embodiment, under another engagement factor, the multi-content interaction program 150 may detect a matching user profile in multiple user devices generating multiple contents. In one embodiment, under another engagement factor, the multi-content interaction program 150 may determine a micro-location within a house or room and the associated known placement of devices therein. In one embodiment, under another engagement factor, the multi-content interaction program 150 may detect interest-based segments of content while the user 204 is distracted.

Then at 304, it is determined that a user engagement with the second content is greater than the user engagement with the first content. According to one embodiment, the multi-content interaction program 150 may determine that the user engagement (e.g., engagement by the user) with the second content is greater than the user engagement with the first content based on one or more real-time focus indicators. In one embodiment, the real-time focus indicators may include the user's physical interactions with the device displaying the second content, the user's gaze, and the user's content engagement score, as described previously with reference to FIG. 2.

Thereafter at 306, a content preservation action is executed to enable the user to reengage with the first content without missing any segments of the first content. According to one embodiment, as the multi-content interaction program 150 detects a degree of significance indicating that the user is more engaged with the second content relative to the first content, the multi-content interaction program 150 may execute one or more content preserving actions to enable the user to reengage with the first content. According to one embodiment, the content preserving actions may include a minimizing action (e.g., minimizing content window; closing out content window; making content window inactive/defocused), a playback action (e.g., pausing content, stopping content, rewinding content), and a recording action.

According to one embodiment, the multi-content interaction program 150 may execute the content preserving action on the first content, the second content, or both contents, depending on the content form factor and the capabilities of the user device displaying the content. In one embodiment, if the first content is a live content (e.g., video live stream; virtual meeting) or unable to be paused, the multi-content interaction program 150 may execute the content preserving action on the second content to enable the user to refocus/reengage with the first content. In one embodiment, executing the content preserving action on the second content may include executing the minimizing action on the second content to interrupt the user from focusing on the second content. By interrupting the user from interacting with the second content, the multi-content interaction program 150 may enable the user to reengage with the first content. However, if the first content is an on-demand content (e.g., on-demand video content) or otherwise controllable, the multi-content interaction program 150 may execute the content preserving action on the first content to enable the user to reengage with the first content at a later time (e.g., after the user is done interacting with the second content) without missing any segments of the first content. In one embodiment, executing the content preserving action on the first content may include executing one of the playback actions (e.g., pausing content, stopping content, rewinding content) and/or the recording action to preserve the first content until the user is done with the second content. For example, the multi-content interaction program 150 may pause an on-demand video content until the user is done drafting an email. After a user interaction with the email is done (e.g., user drafted the email and sent the email), the multi-content interaction program 150 may automatically resume the on-demand video content to enable the user to reengage with the first content.

It is contemplated that the multi-content interaction program 150 may provide several advantages and/or improvements to the technical field of digital media consumption as detailed above. The multi-content interaction program 150 may also improve the functionality of a computer because the multi-content interaction program 150 may enable the computer to detect a dual modal content interaction using a mobile device and an alternative device and in response to detecting the user engagement in the mobile device, interrupting the dual modal content interaction by minimizing the content on the mobile device or pausing the content on the alternative device to enable reengagement with the content on the alternative device.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
detecting a user engaging with a first content and a second content simultaneously;
determining that the user is more engaged with the second content relative to the first content; and
executing a content preserving action to enable the user to reengage with the first content without missing any segments of the first content.

2. The computer-implemented method of claim 1, wherein the first content and the second content are co-located on a single device using picture-in-picture.

3. The computer-implemented method of claim 1, wherein the first content is located on a first user device and the second content is located on a second user device.

4. The computer-implemented method of claim 3, wherein determining that the user is more engaged with the second content relative to the first content further comprises:
detecting that the second user device is in a face recognition state, wherein the face recognition state indicates that a gaze of the user is directed towards the second content displayed on the second user device.

5. The computer-implemented method of claim 1, further comprising:
determining that the first content is a live video content; and
executing the content preserving action on the second content by minimizing the second content to enable the user to reengage with the first content.

6. The computer-implemented method of claim 1, further comprising:
determining that the first content is an on-demand video content;
executing the content preserving action on the first content by pausing the first content to enable the user to reengage with the first content after a user interaction with the second content is completed; and
automatically resuming the first content responsive to determining that the user interaction with the second content is completed.

7. The computer-implemented method of claim 1, further comprising:
determining that the first content and the second content are associated with a matching user profile associated with the user.

8. A computer system for multi-content interactions, the computer system comprising:
one or more processors, one or more computer-readable memories and one or more computer-readable storage media;
program instructions, stored on at least one of the one or more storage media for execution by at least one of the one or more processors via at least one of the one or more memories, to detect a user engaging with a first content and a second content simultaneously;
program instructions, stored on at least one of the one or more storage media for execution by at least one of the one or more processors via at least one of the one or more memories, to determine that the user is more engaged with the second content relative to the first content; and
program instructions, stored on at least one of the one or more storage media for execution by at least one of the one or more processors via at least one of the one or more memories, to execute a content preserving action to enable the user to reengage with the first content without missing any segments of the first content.

9. The computer system of claim 8, wherein the first content and the second content are co-located on a single device using picture-in-picture.

10. The computer system of claim 8, wherein the first content is located on a first user device and the second content is located on a second user device.

11. The computer system of claim 10, wherein the program instructions to determine that the user is more engaged with the second content relative to the first content further comprises:
program instructions, stored on at least one of the one or more storage media for execution by at least one of the one or more processors via at least one of the one or more memories, to detect that the second user device is in a face recognition state, wherein the face recognition state indicates that a gaze of the user is directed towards the second content displayed on the second user device.

12. The computer system of claim 8, further comprising:
program instructions, stored on at least one of the one or more storage media for execution by at least one of the one or more processors via at least one of the one or more memories, to determine that the first content is a live video content; and
program instructions, stored on at least one of the one or more storage media for execution by at least one of the one or more processors via at least one of the one or more memories, to execute the content preserving action on the second content by minimizing the second content to enable the user to reengage with the first content.

13. The computer system of claim 8, further comprising:
program instructions, stored on at least one of the one or more storage media for execution by at least one of the one or more processors via at least one of the one or more memories, to determine that the first content is an on-demand video content;
program instructions, stored on at least one of the one or more storage media for execution by at least one of the one or more processors via at least one of the one or more memories, to execute the content preserving action on the first content by pausing the first content to enable the user to reengage with the first content after a user interaction with the second content is completed; and
program instructions, stored on at least one of the one or more storage media for execution by at least one of the one or more processors via at least one of the one or more memories, to automatically resume the first content responsive to determining that the user interaction with the second content is completed.

14. The computer system of claim 8, further comprising:
program instructions, stored on at least one of the one or more storage media for execution by at least one of the one or more processors via at least one of the one or more memories, to determine that the first content and the second content are associated with a matching user profile associated with the user.

15. A computer program product for multi-content interactions, the computer program product comprising:
one or more computer-readable storage media;
program instructions, stored on at least one of the one or more storage media, to detect a user engaging with a first content and a second content simultaneously;
program instructions, stored on at least one of the one or more storage media, to determine that the user is more engaged with the second content relative to the first content; and
program instructions, stored on at least one of the one or more storage media, to execute a content preserving action to enable the user to reengage with the first content without missing any segments of the first content.

16. The computer program product of claim 15, wherein the first content and the second content are co-located on a single device using picture-in-picture.

17. The computer program product of claim 15, wherein the first content is located on a first user device and the second content is located on a second user device.

18. The computer program product of claim 15, further comprising:
program instructions, stored on at least one of the one or more storage media, to determine that the first content is a live video content; and
program instructions, stored on at least one of the one or more storage media, to execute the content preserving action on the second content by minimizing the second content to enable the user to reengage with the first content.

19. The computer program product of claim 15, further comprising:
program instructions, stored on at least one of the one or more storage media, to determine that the first content is an on-demand video content;
program instructions, stored on at least one of the one or more storage media, to execute the content preserving action on the first content by pausing the first content to enable the user to reengage with the first content after a user interaction with the second content is completed; and
program instructions, stored on at least one of the one or more storage media, to automatically resume the first content responsive to determining that the user interaction with the second content is completed.

20. The computer program product of claim 15, further comprising:
program instructions, stored on at least one of the one or more storage media, to determine that the first content and the second content are associated with a matching user profile associated with the user.

* * * * *